Sept. 25, 1962 W. PFERD 3,055,679
CARD HOLDER FOR CARD DIALER
Filed March 8, 1960 2 Sheets-Sheet 1

INVENTOR
W. PFERD
BY
Joseph C. Redmond, Jr.
ATTORNEY

Sept. 25, 1962      W. PFERD      3,055,679
CARD HOLDER FOR CARD DIALER
Filed March 8, 1960      2 Sheets-Sheet 2
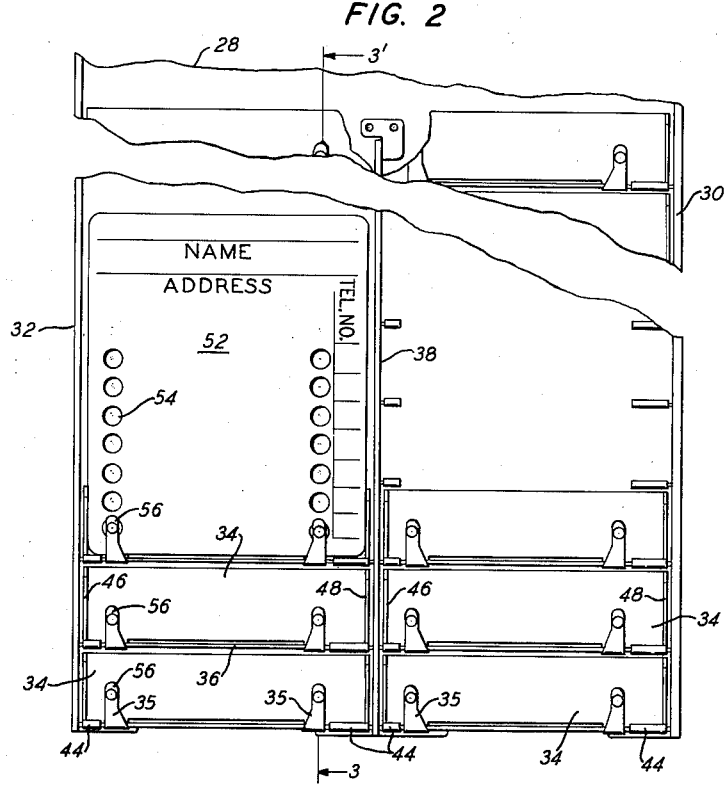
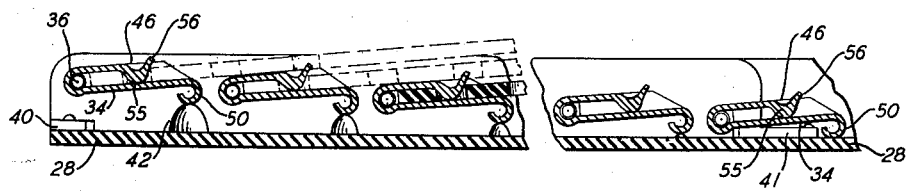
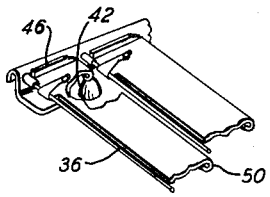
INVENTOR
W. PFERD
BY
*Joseph C. Redmond, Jr.*
ATTORNEY United States Patent Office 3,055,679
Patented Sept. 25, 1962

3,055,679
CARD HOLDER FOR CARD DIALER
William Pferd, Watchung, N.J., assignor to Bell Telephone Laboratories, Incorporated, New York, N.Y., a corporation of New York
Filed Mar. 8, 1960, Ser. No. 13,685
6 Claims. (Cl. 281—4)

This invention relates to accessories for telephone apparatus and, more particularly, to a card index and directory folder employed with automatic dialing devices.

In my previously filed application Serial No. 844,054, filed May 5, 1959, an automatic dialing device is described which employs encoded cards for the operation thereof. Each card has space thereon for indicating the name, telephone number and address of a subscriber frequently called.

The efficient use of such a device requires that the encoded cards of those numbers frequently called be readily available to the subscriber. From a convenience standpoint, it is also desirable that all other telephone numbers called regularly be readily available to permit the subscriber to prepare encoded cards for such numbers if desired or to facilitate the replacement of lost or misplaced encoded cards for those numbers called frequently. As a consequence, it is necessary that an accessory be provided with an automatic dialer which will enable a subscriber to prepare and store encoded cards for the operation of the dialer. For subscriber appeal and usefulness, the accessory should be compact, permit quick access to telephone numbers regularly called and provide safe storage for encoded cards prepared for those subscribers frequently called.

An object of the present invention is an accessory for use with an automatic dialer which permits more efficient operation thereof.

Another object of the invention is a compact folder which provides safe storage of encoded cards employed with automatic dialers and quick access to cards prepared for those subscribers frequently called.

Still another object is a folder employed with an automatic dialer and including a vertical card index file which is adapted to stack encoded cards therein to prevent bending thereof or separation therebetween.

In an illustrative embodiment the present invention comprises a folder including a vertical card index file and a booklet for listing regularly called telephone numbers. The vertical card index file includes means for mounting a vertical series of flaps, each including one or more tab means for securing an encoded card to the flap. The mounting means also include means for aligning a portion of the flaps in different planar relation. Each encoded card has a column of holes along each side thereof for engaging the sprocket mechanism of the dialer disclosed in my previously filed application cited above and is held by a flap which overlays the encoded card held in the next adjacent flap. The tab means of each flap engages one of the columnar holes of the secured card and extends into one of the columnar holes of the overlaying card. The alignment of the flaps in combination with the positioning of the tab means prevents cards held in the file from being bent or developing space between overlaying cards which would otherwise increase the bulkiness of the file.

These and other objects of the invention will be more fully apprehended from the following detailed specification taken in conjunction with the appended drawing in which:

FIG. 2 is a plan view of the vertical card index file employed in FIG. 1;

FIG. 3 is a side view of FIG. 2 along the lines 3—3'; and

FIG. 4 is a partial view of a flap member shown in FIG. 2 with parts broken away to show the contact of the flap with a flap stop.

Figure 1:
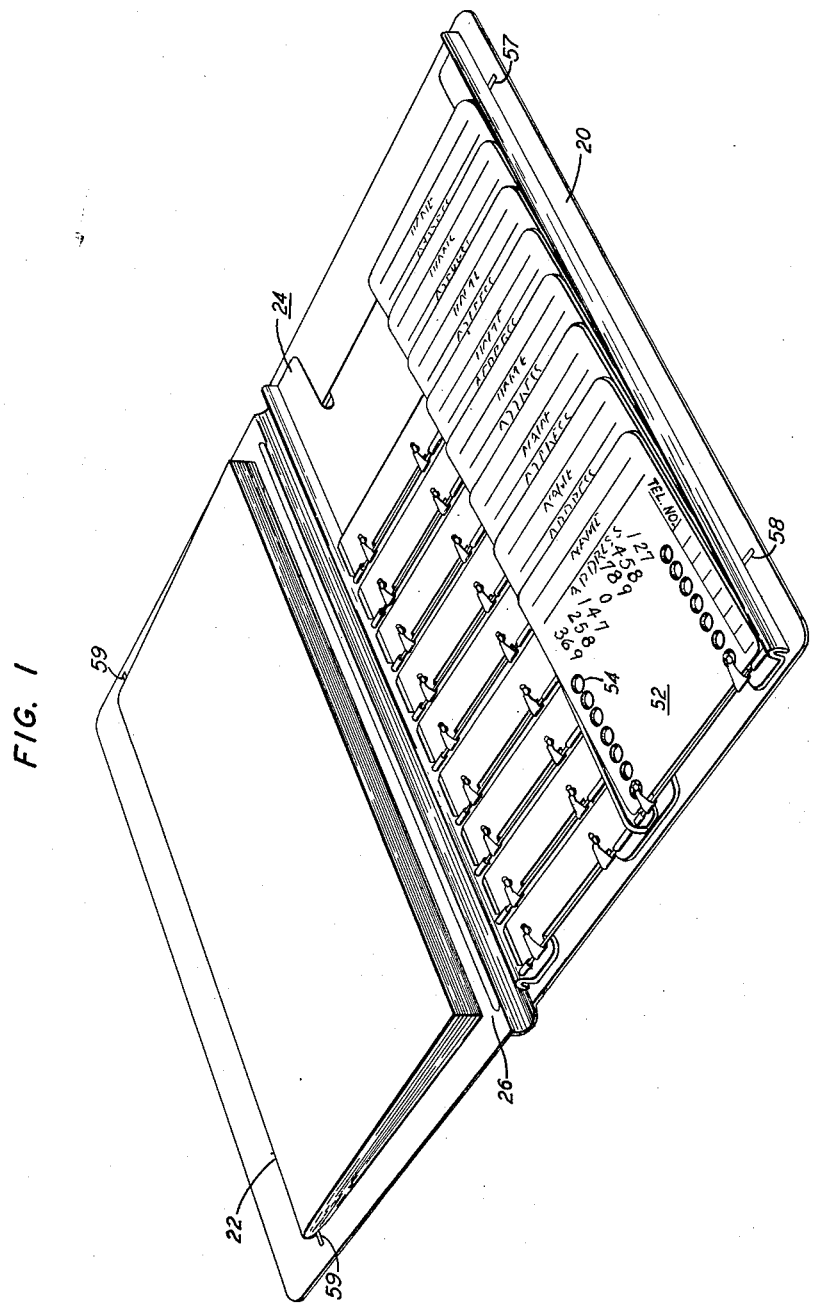
FIG. 1 is a perspective view of the present invention showing a folder including a booklet and a vertical index file.

Referring to FIG. 1, the present invention comprises a folder 20 prepared from two overlaying layers of any suitable material, typically plastic, having a vertical slot 59 and horizontal slots 57, 58 in the left-hand and right-hand halves respectively of one of the layers. The slot 59 permits an element of the booklet 22 and the slots 57, 58 permit elements of the vertical card index file to be inserted between the layers of the folder and thereby held with respect to the folder; a mounting arrangement which is believed to be well known in the folder art. The folder also includes one or more crease marks 26 between the booklet and the card index file to facilitate folding of the folder into a compact package which may be advantageously placed near to the automatic dialing apparatus with which it is employed.

The booklet 22 is adapted to permit the alphabetical listing of subscriber names and their telephone numbers therein thereby facilitating a subscriber's entry into the booklet to locate a telephone number desired to be called. The booklet may be constructed from any suitable material, for example, paper.

The vertical card index file is shown in more detail in FIGS. 2, 3 and 4. The file comprises a mounting plate 28 having crimped edges 30 and 32, a plurality of flaps 34, each flap including one or more clip or tab members 35 and being journaled on a rod member 36 that is supported by a central support bar 38 and the crimped edges 30 and 32. The support bar is integral with base plates 40 and 41 (see FIG. 3) that are riveted to the mounting plate. Also included in the mounting plate are flap stops 42 shown in FIG. 3, the stops being of different heights commencing from one end of the mounting plate and extending to the other end thereof for reasons more apparent hereinafter.

As shown in FIGS. 2 and 3, each flap is hinged about the lower edge (as viewed in FIG. 2) to the rod member associated therewith. Extending from the lower edge of each flap are one or more sleeve portions 44 (also see FIG. 4) in addition to the tab members 35. Each clip or tab member is bent back over the rod member to form a journal therefor and overlays the flap as shown in FIG. 3. Similarly arranged but not shown are the sleeve sections which are bent about the rod member to partially enclose the rod. As a result, the rod serves as an axle for the flap which can rotate thereabout. The side edges of the flaps are bent upward and parallel to the support bar or the crimped edges of the mounting plate, as the case may be, to provide the flaps with guiding means 46 and 48. The guiding means are beveled at the entry end thereof and direct encoded cards 52 to be stored in the file into engagement with the tab portions thereof. The guiding means also prevent lateral movement of the cards with respect to the flap. The upper edges of the flaps are formed into bent end sections 50. The bent ends of the flap engage the flap stops 42 to prevent the encoded cards 52 from being bent in the card index file as will be explained in more detail hereinafter.

Through the tab means associated with each flap, the encoded cards are held in the vertical card index file. Each card 52 is of punchable material and has space thereon for indicating the name, address and telephone number of a person that may be called with the card after encoding thereof. The card also includes a plurality of prepunched holes 54 in columnar fashion along each side thereof, the holes being adapted to engage the sprocket mechanism of the dialer (not shown) of the type disclosed in my previously filed application cited above. The portions of the clip or tab members overlaying the flaps include a depressed portion 55 in series with a turned up edge 56, the latter element lifting the tab or clip when the end of the card 52 is urged thereagainst. The depressed portion of the tab or clip holds the card with respect to the flap by engaging one of the holes 54.

As shown in FIG. 3, encoded cards stored in the file are arranged in overlaying relation. The rod members of the several flaps are positioned in different planar relation, the rod members of the flaps above the lowest flap (viewed from FIG. 2) being succeedingly closer to the mounting plate than the lowest flap. This arrangement of the rod members permits the cards stacked in the file to be substantially parallel to the mounting plate instead of forming the stair step arrangement which would result if all the rod members were in the same planar relation.

To prevent the turned up edge 56 of each tab from engaging the surface of the overlaying card thereby separating the cards and increasing the bulkiness of the file, the present invention is adapted to prevent such contact by having the length of each tab member selected such that the turned up edge extends into one of the holes 54 of the overlaying card instead of engaging the surface thereof. In the absence of this arrangement, it will be seen that not only will the bulkiness of the file be increased but pressure applied to the surface of overlaying cards may tend to break the turned up edge of the tabs included in underlying cards which in turn will reduce the holding action of such tabs.

The flap stops 42 are designed to prevent encoded cards filed in the card file from being bent or otherwise deformed to the point that a card may not properly operate the dialer due to handling of the folder. As shown in FIG. 3, each card stored in the file is supported by one or more of the underlying cards except the uppermost card (as viewed in FIG. 2) that engages the mounting plate 28. The overlaying feature of the cards prevents all of the flaps in the file except the uppermost flap from engaging the mounting plate. As a consequence, those flaps which do not engage the mounting plate are capable of additional movement toward the plate, in the absence of the flap stops, from pressure applied to the surface of the cards during handling of the folder. If the pressure applied to the surface of the cards is sufficient, the cards in the flaps will bend or be deformed in shape as the flaps move toward the mounting plate. Due to the positioning of the rod members, the distance between each flap and the mounting plate for cards stored in the file decreases from one flap to the next in going from one end to the other end of the file (see FIG. 3). Thus, to prevent flap movement which will cause bending of the cards, due to handling of the folder and at the same time prevent an increase in the bulkiness of the file, the heights of the flap stops are selected to correspond to the distance between the flap and the mounting plate when cards are stored in the file.

The present invention is employed in conjunction with automatic dialer apparatus by preparing encoded cards for those subscribers frequently called after indicating the name, address and telephone number in the spaces provided on the respective cards and in the booklet. Other telephone numbers regularly called are listed in the booklet for future reference purposes in the preparation of new dialing cards or the replacement of those cards lost or misplaced. The folder is placed near to the dialer apparatus for immediate use.

When it is desired to dial a subscriber called frequently, the folder is opened displaying the names and addresses on the card of those persons frequently called. The cards may then be flipped down to expose the desired card for withdrawal or the desired card can be withdrawn immediately. Hence the folder provides quick access to the cards of these subscribers frequently called. In addition, the booklet permits the subscriber to obtain quickly the telephone number of other subscribers regularly called. After dialing, the encoded card may be returned to the folder for safe storage and protection against damage to the card.

Thus, the present invention provides means which increases the efficiency of the automatic dialing apparatus. The folder is arranged in a compact package so as to permit convenient storage near automatic dialing apparatus.

It is believed apparent that the above-described embodiment is only illustrative of the principles of the present invention. Numerous other embodiments of the present invention may be made by those skilled in the art without departing from the spirit and scope of the present invention.

What is claimed is:

1. A vertical card index file comprising a mounting plate including crimped edges and a support bar, said mounting plate also including flap stops in spaced intervals along the surface thereof, a plurality of rod members mounted in said crimped edges and support bar in spaced relation corresponding to that of the flap stops, said bars being in different planar relation commencing from one end of the mounting plate to the other end in a step-like fashion, and at least one flap hinged to each rod member, each flap including guide means, tab portions and a bent end section for engaging the flap stops, each tab member including a turned up portion for securing a card to said flap.

2. A storage device for cards having a series of holes adjacent one edge thereof and spaced a predetermined distance from one another, said device comprising mounting means, a plurality of card receiving flaps hingedly mounted in an array in said mounting means in such positions that cards mounted on said flaps will overlay one another, and each of said flaps having at least one spring clip thereon for holding one of said cards against the flap, each of said clips having a depressed section in series with a turned up end, said turned up end being away from the flap such that when the card is urged against the turned up end the clip will be lifted to permit the card to be inserted between the clip and the flap, said depressed portion adapted to extend into and engage a hole in the card inserted between the clip and the flap to prevent relative movement of the card with respect to the flap.

3. A storage device as defined in claim 2 having the flaps so arranged on the mounting means that one of the holes of each overlaying card will receive the turned up edge of the clip underlying the card thereby preventing bending of the card by said turned up edge.

4. A storage device as defined in claim 2 wherein said mounting means defines a plane wherein each succeeding flap in the array beyond that adapted to support the outermost card is mounted closer to the plane of the mounting means than the preceding flap such that cards mounted in succeeding flaps can lie flat against one another, and wherein at least one flap stop is mounted under each flap, each of said flap stops having a height such as to support its associated flap in approximately the position in which the flap would be supported by a card mounted therein whereby bending stress on the card is avoided.

5. Apparatus for storing cards employed with automatic dialer apparatus comprising in combination a folder, a vertical card index file, a booklet, and a plurality of cards; each of said cards having holes therein; said folder having means for mounting said file and said booklet; said file comprising a mounting plate including crimped edges and a support bar, a plurality of rod members mounted in said crimped edges and support bar in spaced relation, at least one flap secured to each rod member, each flap including guide means and tab members, each flap being adapted to secure a card to said flap by said tab means and so positioned that the cards arranged in the file are in overlaying relation in planes substantially parallel to the mounting plate; each of said tabs being of such a preselected length as to permit a bent end portion thereof to extend into one of the holes included in the overlaying card whereby bending of the cards is prevented.

6. Apparatus for storing cards employed with automatic dialer apparatus comprising in combination a folder, a vertical card index file, a booklet, and a plurality of cards; said folder having means for mounting said file and said booklet; said file comprising a mounting plate for mounting a plurality of hinged flaps in juxtaposed relation, said plate including flanged stops associated with each flap, said stops being different in height for each flap, and means for securing said cards in the file so that said cards are substantially parallel to the mounting plate and in an overlaying relation with each of said cards supported by the securing means immediately beneath it whereby bending of the cards is prevented.

References Cited in the file of this patent
UNITED STATES PATENTS

| | | |
|---|---|---|
| 2,040,251 | Fabry | May 12, 1936 |
| 2,871,153 | Copen | Jan. 27, 1959 |